July 18, 1944.  J. S. BAKER  2,353,805
COOKER
Filed June 28, 1940  7 Sheets-Sheet 5

Fig.5.

INVENTOR.
John S. Baker
BY
Alexander Dowell
ATTORNEYS.

Patented July 18, 1944

2,353,805

UNITED STATES PATENT OFFICE 2,353,805

COOKER

John S. Baker, Los Angeles, Calif.

Application June 28, 1940, Serial No. 343,030

23 Claims. (Cl. 99—360)

My invention relates to an automatic continuous agitating cooker, such as used by the canning industry for cooking foods hermetically sealed in cans, and more particularly relates to an automatic continuous system with feeding means for automatically aligning a plurality of cans in successive rows in which the cans are freely disposed end to end so that they may adjust themselves laterally according to their lengths while being aligned in the rows, or by gravitation while the rows are being moved through the chamber. In continuous agitating cookers the cans are rolled through the heating chamber from the inlet until discharged. This continuous agitation of the contents of the cans materially reduces the cooking periods of some foods, but is not as effective for other foods, and thus this fact necessitates wide variations of cooking periods. Such cookers must be built large enough, or the canway long enough, in order to handle the capacity of the cannery for cooking foods requiring the longest cooking periods. When foods requiring short cooking periods are being processed, only about half of the canway may be utilized.

Therefore one object of my invention is to provide a cooker with a single flat canway within the heating chamber on which the cans are rolled or agitated, an endless can propeller having single longitudinal can pockets extending across the canway for receiving a plurality of cans from the feed valves disposed end to end therein, said propeller rolling the cans along the canway until discharged from the cooker; also to provide two independent can feeds at opposite sides of the cooker for feeding the cans thereto, so that when foods are being processed which require long cooking periods, either of said feeds alone may be utilized to feed cans into the single longitudinal can pockets of the propeller; also when the speed of the machine is increased for processing foods requiring short cooking periods, both feeds may be utilized simultaneously to fill the single can pockets of the propeller, thus substantially doubling the capacity of the cooker, the cans from the two feeds entering the canway from opposite sides being deposited in their respective halves of the single can pockets of the propeller. Another object is to make each of the single longitudinal can pockets of the can propeller within the chamber pitched so that a plurality of cans from the feeding means may be deposited therein, end to end, and the cans at one side of said single pocket will automatically remain separated from the cans at the other side of the same pocket, by gravitation, while being rolled along the canway by the can propeller until discharged from the chamber. This permits two separate lines of canned foods, which may be different kinds of foods, to be processed simultaneously in a single canway within the chamber without becoming mixed, and without requiring any kind of adjustments of the canway or can propeller within the chamber.

A further object of the invention is to provide means for varying the capacity of the cooker relative to the length of the cans being processed. Many different sizes of cans are used in the canning industry. When short cans are used, the single longitudinal can pockets of the propeller within the heating chamber will accommodate a greater number of cans than can be accommodated when using longer cans, therefore novel means are provided for increasing the speed of the can feeds when short cans are used so that more cans are fed per time interval to the propeller can pockets than when longer cans are used.

A still further object of the invention is to provide two placer can feeds adapted to receive cans from separate sources and position the cans therefrom in line, with cans disposed end to end which are being fed into the canway within the heating chamber; also novel means for pushing the cans into such position and which will result in elimination of all space between the cans, thus permitting the can propeller pockets within the heating chamber to be made of less length than heretofore.

A still further object of my invention is to provide a novel intermittent drive for the placer feeds so that they will stop intermittently with their can pusher attachments disposed at predetermined positions while the accumulated cans are being moved therefrom into the canway within the heating chamber, so that the cans will always be accurately positioned therein.

A still further object of my invention is to provide novel T-shaped can pusher bars forming the pockets of the can propeller within the heating chamber, the flanges of the T-bars fitting under the rolling cans at each side thereof and thus giving added strength to the bars without increasing the width of the can pockets while permitting the cans to roll along on the top of the upper canway, which rolling action is essential in agitating cookers, the flanges of the T-bars also preventing the cans in the lower canway from rising due to the presence of boiling water in the tank, said flanges thus eliminating the usual top can guard over the cans in the lower canway, and said flanges also carrying the cans around the end of the canway from the upper to the lower level, thereby eliminating the necessity of an inner can track at said end.

Other minor objects of the invention will be hereinafter set forth.

I will explain the invention with reference to the accompanying drawings which illustrate one practical embodiment thereof to enable others familiar with the art to adopt and use the same; and will summarize in the claims the novel features of construction and novel combinations of parts, for which protection is desired.

In said drawings—

The cooker comprises a horizontally disposed tank 1 of rectangular cross-section open at each end. A frame 2 is riveted to the rear end (Figs. 3, 4 and 6) carrying lugs 2a in which bolts 2b are pivoted carrying nuts 2c, which bolts enter peripheral notches in the detachable rear end plate 3 and may be tightened by nuts 2c to compress a suitable gasket (Fig. 4) disposed between plate 3 and frame 2 to form a steam-tight joint; or bolts 2b may be loosened and swung outwardly to permit removal of plate 3.

*The canway, can propeller, and driving mechanism*

Within tank 1 is a canway comprising upper and lower spaced horizontal can tracks 4 and 5 of perforated sheet metal, one disposed above the other, upon which the cans C roll (Figs. 4, 5 and 6), tracks 4 and 5 being mounted upon cross-bar supports 4a, 5a, secured at their ends to uprights 6 disposed at each side of canway 4—5. The lower ends of uprights 6 are secured to angle iron skids 7 so that the entire canway assembly may be conveniently inserted into or removed from tank 1 through the open rear end, when end plate 3 is removed.

At the rear end of canway 4—5—6 is an adjustable guide 8 adapted to hold the cans in the pockets of the propeller as they pass from the upper can track 4 down to the lower track 5, and extending rearwardly from each upright 6, at said end are spaced parallel horizontally disposed arms 9, 9a (Fig. 4) between which are slidably mounted journal blocks 10 for a sprocket shaft 11, said blocks having adjustment screws 10a passing therethrough with their inner ends abutting against said uprights whereby the blocks may be adjusted to tension endless chains of the propeller (hereinafter described). Guide 8 is mounted at each end on blocks 10 so that guide 8 and shaft 11 will move together when making adjustments, thereby maintaining the space between the guide and pusher bars of the chains uniform. Blocks 10 each have grooves milled in their upper and lower faces receiving the opposed faces of the narrow arms 9, 9a. A plate 5x (Fig. 4) extends from the rear end of lower can track 5 of same width as said can track and forms part of the lower track when guide 8 is moved its maximum rearward extent.

Figure 4:
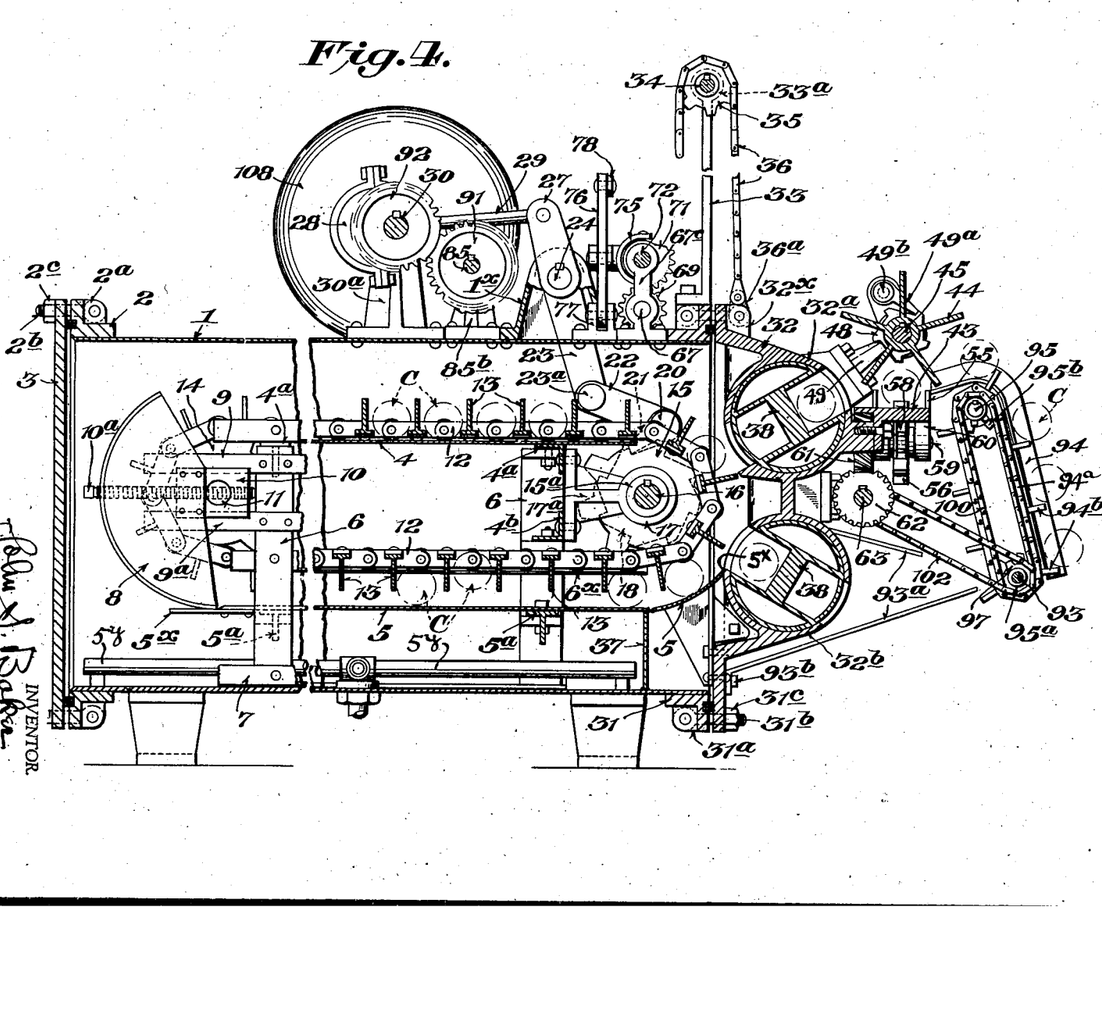
Fig. 4 is a vertical longitudinal section taken approximately on the line 4—4, Fig. 6.
Figure 14:
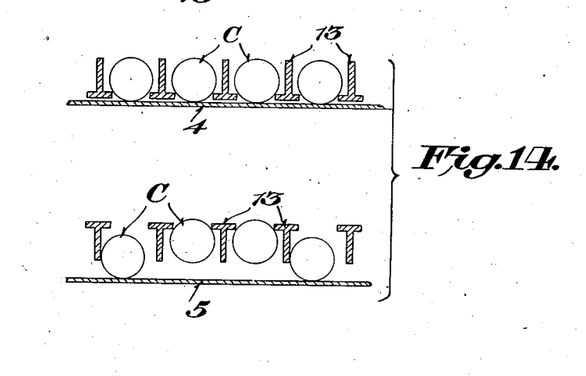
Fig. 14 is a section showing the T-shaped can pusher bars which move the cans along the upper and lower levels of canway within the heating chamber.

At each side of canway 4—5 are endless roller chains 12 and spaced T-shaped pusher bars 13 (Figs. 4, 5 and 6) which extend transversely of the canway and have their T-heads secured to the respective chains 12 to form an endless can propeller, with single longitudinal can pockets each receiving a row of cans disposed end to end, which cans roll along the can track 4 and around guide 8 onto can track 5 until discharged from tank 1. No can track is required at the extreme front and rear ends of the upper can track 4 as the underlying edges of adjacent T-heads of the pusher bars 13 will support and carry the cans C around said ends; and no can guard is required above the cans on the lower can track 5 as the overlying edges of adjacent T-heads of the bars 13 prevent the cans from rising or floating out of the pockets of the lower run in the boiling water in the lower portion of the tank as shown in Figs. 4 and 14.

Figure 6:
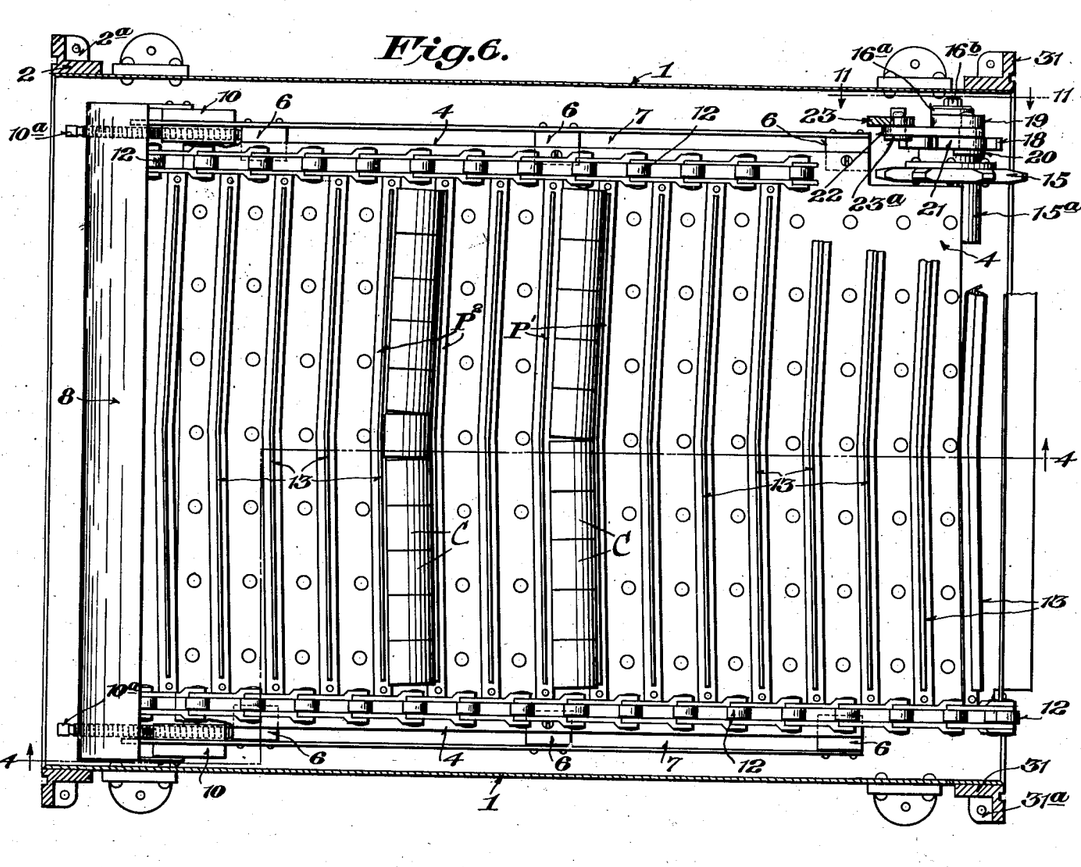
Fig. 6 is a horizontal section on the line 6—6, Fig. 3.

The longitudinal can pockets each hold a plurality of cans C (Figs. 4 and 6) and the number of cans that may be fed into each can pocket will vary according to the length of the cans processed. Referring to Fig. 6, the can pocket P' is shown to hold only ten of the longer cans C, while pocket P² is shown to hold eleven shorter cans. Adjustment of the number of cans fed into the respective can pockets formed between adjacent bars 13 of the propeller is obtained by increasing or decreasing the speed of the can feeding mechanism hereinafter described.

Pusher bars 13 are of slight angular shape having apexes at their centers slightly in advance of their ends, which form single pitched can pockets, whereby the cans C, fed adjacent the center of the can pockets will work towards each side edge of the canway 4—5 as they are rolled along the upper track 4 and lower track 5 by bars 13, until said cans are discharged from the tank. This arrangement prevents the cans, at one end of a can pocket of the propeller, from mixing with cans at the other end thereof, whereby when two separate can feeding devices are utilized to feed two different kinds of canned foods into a can pocket for simultaneous processing, the two kinds will not become mixed in the individual pockets. However, other arrangements of pitching the bars 13 or canway 4—5 may be used to produce the same result wherein a can propeller, with single longitudinal can pockets, may be filled with cans from either one or two can feeds, and when two feeds are utilized the cans fed from each feed will positively remain separated in the individual can pockets as they are rolled along the canway to the point where they are discharged from the tank and without making or requiring any kind of adjustment in or to the canway or can propeller.

Endless chains 12 run over sprocket wheels 14 and 15, respectively, said chains rolling upon the upper can track 4 (Figs. 4—5—6) and rolling on angle iron tracks 6x (Figs. 4—5) riveted to supports 6 between tracks 4 and 5. The sprocket wheels 14 are loose on the fixed shaft 11 (Fig. 4) the ends of which shaft are mounted in adjustable blocks 10. The driving sprocket wheels 15 are keyed upon a drive shaft 16 and have hubs 15a on their inner faces which form bearings for shaft 16, said hubs 15a being journaled in bearings 17 having bases 17a mounted on angle irons 4a—4b which form cross-bar supports for the front end of the canway and which bars 4a—4b are connected at their ends to uprights 6.

On the outer face of one drive sprocket wheel 15 (Fig. 5) is mounted a ratchet wheel 18 (Figs. 4, 5, 6, 11). An arm 19 is loose on shaft 16 and has a hub extending inwardly through a central bore in ratchet wheel 18 and abutting against sprocket wheel 15, same being held in place on shaft 16 by a washer 16a clamped against the end of the shaft by a cap screw 16b. A pivot pin 20 is carried by arm 19 and a pawl 21 is pivoted thereon engaging ratchet wheel 18. One end of link 22 is also pivoted on pin 20, the other end thereof being pivotally connected as at 23a to an arm 23 keyed to rocker shaft 24 and housed within a steam-tight housing 1x on top of tank 1 communicating with the interior thereof. Shaft 24 has one bearing at 1y in housing 1x (Fig. 5) said shaft passing through stuffing box 25 which prevents the escape of steam from the tank 1 and housing 1x along shaft 24, the other end of said shaft being journaled in a bearing 26 mounted upon the top of tank 1. An arm 27 keyed on shaft 24 is pivotally connected to an eccentric 28 by connecting rod 29, eccentric 28 being keyed on the main drive shaft 30 which extends across the top of tank 1 supported in bearings 30a.

Each complete rotation of shaft 30 makes a complete cycle of operations for actuating the propeller 12—13 through one intermittent step, one-half revolution of eccentric 28 on drive shaft 30 imparting a full forward movement through one step of the can push bars 13, the remaining half revolution of eccentric 28 merely effecting retraction of pawl arm 19 into position for a subsequent engagement of pawl 21 to shift ratchet wheel 18. Referring to Fig. 4, eccentric 28 has reached its full retracted dead center, and on the next half revolution of shaft 30 said eccentric 28 will rock arm 23, whereby the link 22 will move pawl 21 into its full projected dead center. Thus the can propeller 12—13 is started just after eccentric 28 passes the retracted dead center, and the propeller is stopped just as the eccentric 28 reaches its projected dead center, resulting in starting and stopping movements of the propeller which are very gentle or gradual without quick or sudden jolts of the cans C by the pusher bars 13, which jolts would tend to break up the contents of the cans.

*The means for detaching and raising the front end of tank*

At the front end of tank 1 is an enveloping frame 31 (Figs. 2, 3, 4) having lugs 31a in which are pivoted bolts 31b carrying nuts 31c. A front end plate 32 is detachably secured to frame 31 by said bolts 31b which engage peripheral notches in the edges of the plate 32, a suitable gasket or packing being interposed between frame 31 and plate 32 to make a steam-tight joint when nuts 31c are tightened.

Uprights 33 (Figs. 1, 2, 4) are mounted on top of frame 31 and have bearings 33a for a shaft 34 provided with a sprocket wheel 35 keyed thereon. A chain 36 runs over sprocket wheel 35, and is connected to a lug 32x on a casting 32 by link 36a. One end 34a of shaft 34 is squared (Fig. 1) to accommodate crank for rotating the shaft to raise plate 32 when nuts 31c are loosened, and bolts 31b are swung out as shown in dotted lines at the bottom of Fig. 1. The detached plate 32 may then be raised by rotating shaft 34 to give quick access to the front end of canway 4—5 and to the front end of can propeller 12—13; also access to the interior of the can feed and discharge valves. Usually any trouble caused by jamming of cans or the like that will necessitate stoppage of the cooker, will occur at the front end of the canway.

The lower portion of tank 1 is filled with water up to the inner opening 5x (Fig. 4) into the discharge valve pocket 38 when cooking with boiling water, or at 212° F. and steam is supplied to the heating chamber by steam pipes 5y adjacent the bottom of tank. When cooking with steam pressure, water is introduced and maintained in the tank to a level about four inches below track 5, and steam is generated in the tank by boiling the water. A separate water-tight wall 37 (Fig. 4) is disposed at the front of tank 1 below the lower can track 5 to prevent the escape of boiling water from the tank 1 when plate 32 is detached and raised, thus rendering it unnecessary to drain the hot water from the tank and refill with cold water as this would cause cooling of the partly cooked canned foods and consequent spoilage of food.

*The can feeding and discharging valves, and their driving mechanism*

Figures 7, 8, 9, 10, 12, 13:
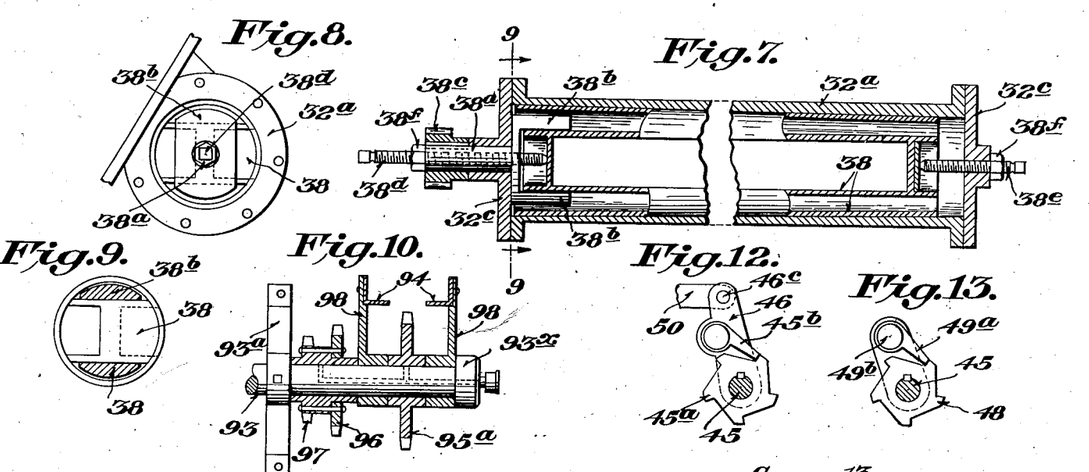
Fig. 7 is a longitudinal section through the can feed valve and cylinder, on the line 7—7, Fig. 3.
Fig. 8 is an end view of the valve and cylinder taken on the line 8—8, Fig. 2, the cylinder head being removed.
Fig. 9 is a transverse section on the line 9—9, Fig. 7.
Fig. 10 is a longitudinal section on the line 10—10, Fig. 3.
Fig. 12 is a section showing the feed wheel ratchet drive, taken on the line 12—12, Fig. 1.
Fig. 13 is a section showing the feed wheel check ratchet which prevents backward movement of the feed wheel, taken on line 13—13, Fig. 1.
Figure 11:
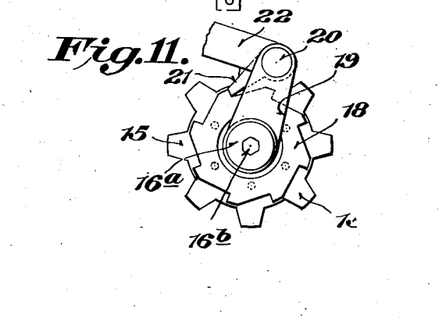
Fig. 11 is a detail elevation showing the can propeller ratchet drive, taken on line 11—11, Fig. 6.

Formed in the front plate 32 are feed and discharge cylinders 32a and 32b respectively (Figs. 1—2—3—4—7—8—9) both identical in construction and operation, and thus a description of one will also explain the other. Cylinders 32a and 32b have detachable cylinder heads 32c removably secured thereto by cap screws or the like. Each cylinder has a tapered valve seat (Fig. 7) with a tapered cylindrical valve 38 freely mounted therein and rotated by a shaft 38a having a forked end 38b engaging openings in the end of the valve 38 (Figs. 7—8—9). Shafts 38a have bearings in cylinder heads 32c at one end of the cylinders, and on their outer ends carry pinions 38c; and said shafts 38a each have tapped bores to accommodate valve adjusting screws 38d. The cylinder heads 32c at the opposite ends of the cylinders also have tapped bores to accommodate adjustment screws 38e (Fig. 7) so that cylindrical tapered valves 38 may be adjusted axially of their tapered seats in cylinders 38a—38b and may be locked in adjusted positions by lock nuts 38f. The forked ends 38b (Figs. 7—8—9) of shafts 38a are sufficiently long to permit extreme adjustments of valves 38 in the cylinders. Valves 38 rotate freely in their seats, and thus the wear on the valves and on their seats is always uniform.

Figure 2:
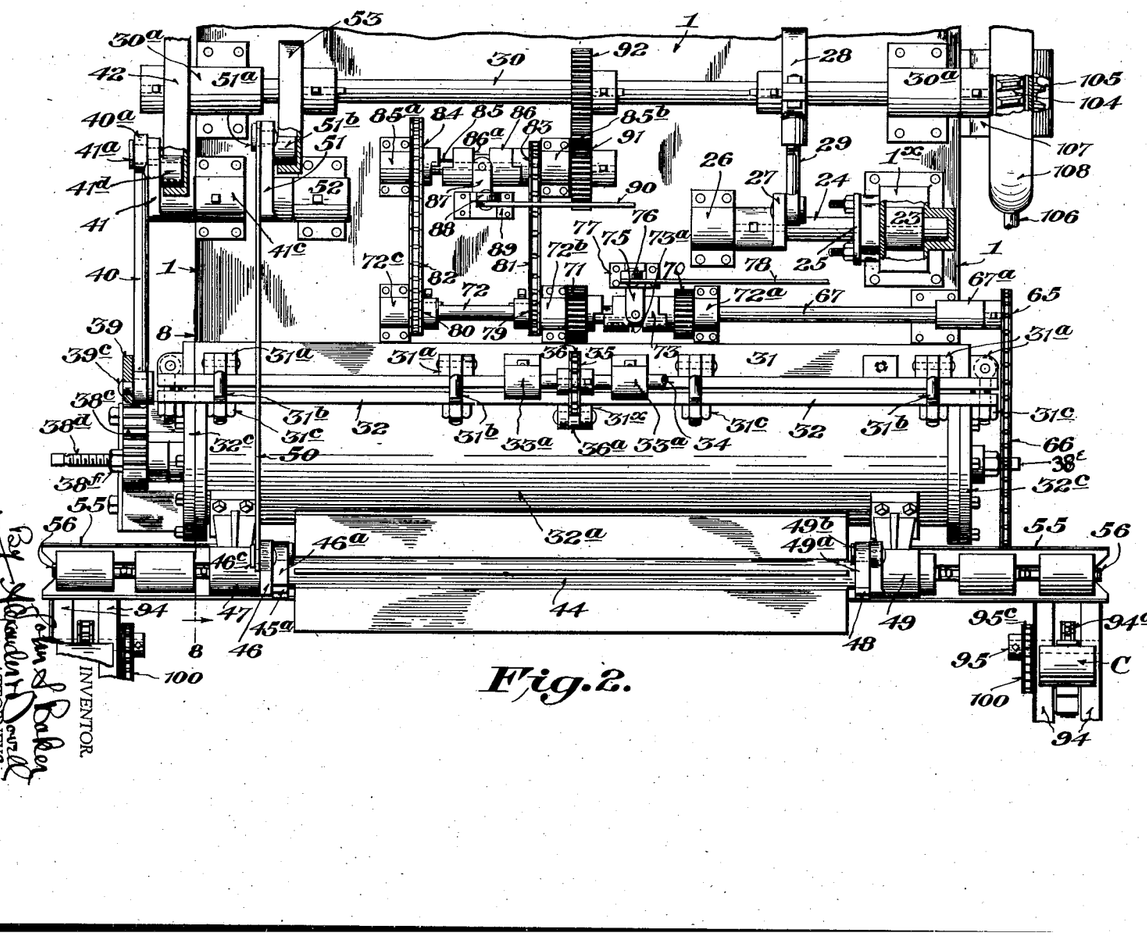
Fig. 2 is a top plan view of the front end of the cooker, showing the driving mechanism thereon.
Figure 3:
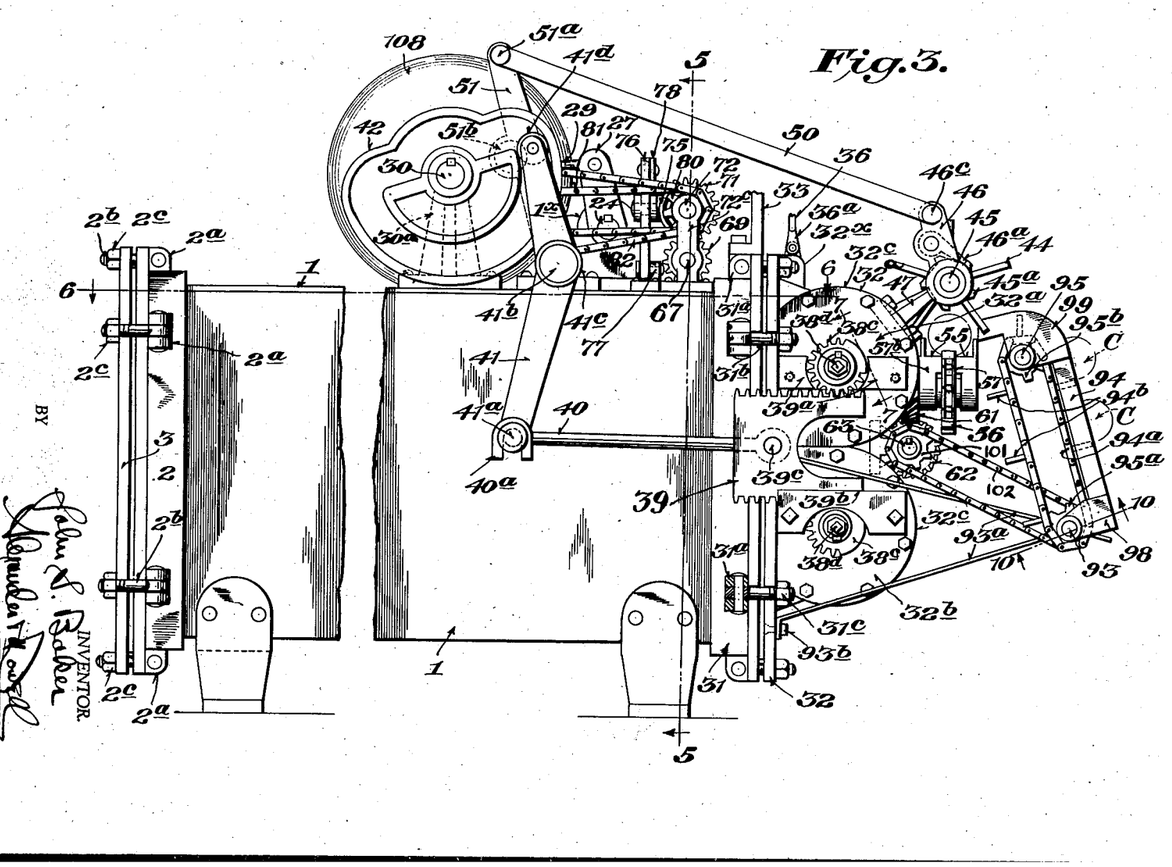
Fig. 3 is a side elevation of the complete cooker.
Figure 5:
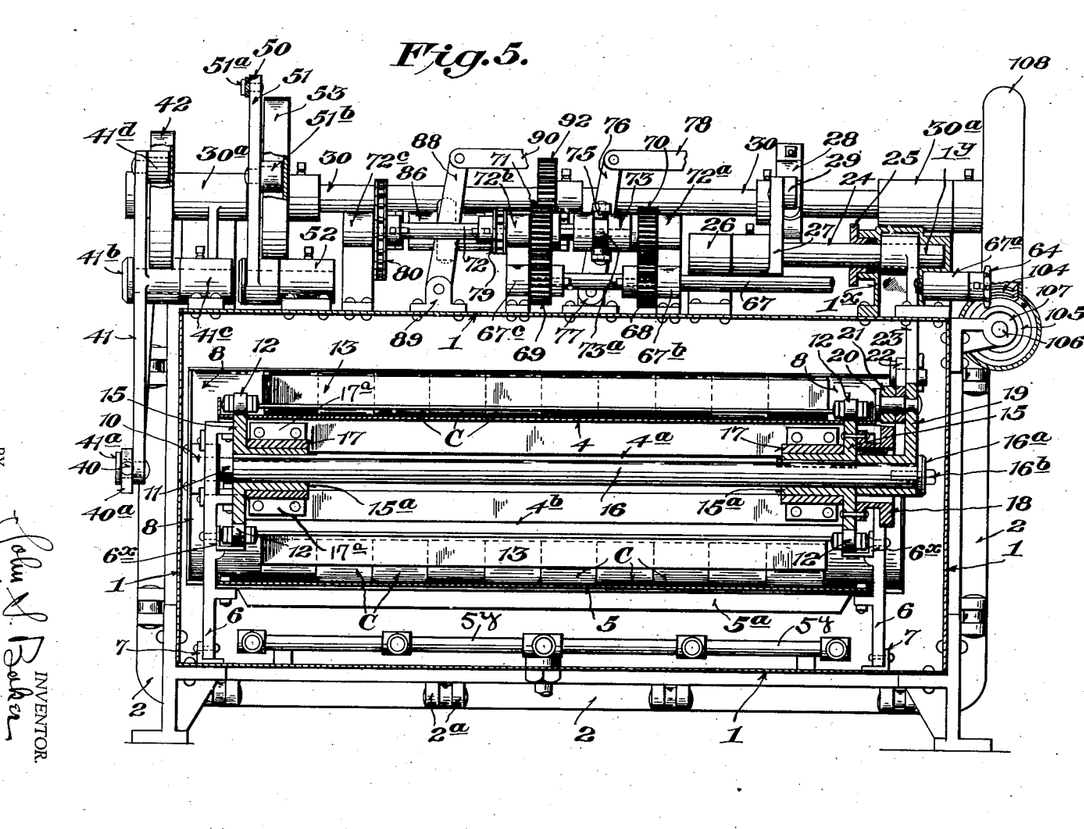
Fig. 5 is a transverse vertical section on the line 5—5, Fig. 3.

Pinions 38c (Figs. 2—3—7) mesh with a double rack 39 sliding in guides 39a on the cylinder heads 32c, said rack being held in the guides by plates 39b (Fig. 3) and having a pivot pin 39c to which a rod 40 is pivotally connected, said rod carrying a yoke 40a adapted to hook over a pin 41a on one arm of a bell-crank lever 41, whereby rod 40 may be quickly disconnected from lever 41 to permit the front plate 32 to be readily detached and raised, and quickly connected again without affecting the timing relation of the can feed and discharge valves 38 with respect to the movement of the can propeller in tank 1. Bell-crank lever 41 is mounted on a stub shaft 41b (Fig. 3) journaled in bearings 41c on the top of tank 1 (Figs. 2—3—5). The other arm of bell-crank lever 41 carries a cam roller 41d operating in the groove in cam disk 42 mounted on the drive shaft 30.

Each rotation of drive shaft 30 makes a complete cycle of movements of the valves 38, since each rotation of cam 42 oscillates the bell-crank lever 41 and imparts a forward and backward movement to rack 39, which in turn oscillates the feed and discharge valves 38 simultaneously in their seats in cylinders 32a—32b respectively to feed cans C into the tank 1 through cylinder 32a, and to discharge cans therefrom through cylinder 32b. As stated, can feed and discharge valves are identical in construction and operation, but are set in opposite positions, so that when the valve pocket of feed cylinder 32a is receiving its cans from the feed wheel 44 (hereinafter described) the valve pocket in discharge cylinder 32b is receiving cans from the can propeller 13, and vice versa, when the feed valve of cylinder 32a oscillates to feed cans to the can pockets of propeller 12—13, the discharge valve of cylinder 32b will discharge the cans from the propeller or heating chamber. The can pockets of the valves 38 oscillate only through the upper portions of the cylinders 32a, 32b, thereby keeping the seats of said valves free from water and grit.

*The can feeds, and their driving mechanism*

A horizontal can track 43 (Figs. 1-4) for holding a series of cans disposed end to end is secured across the front of feed cylinder 32a, the top of track 43 being level with and opposite the bottom of the can intake port of cylinder 32a (Fig. 4), so that the cans positioned on said track may be swept as hereinafter described into the feed valve pockets of said cylinder. Above track 43 is a feed wheel 44 carrying five blades, said wheel being mounted on a shaft 45 intermittently rotated one-fifth turn, the blades on each movement engaging the series of cans disposed therebetween on track 43 and sweeping them into the valve pockets. At one end of feed wheel 44 is a five-toothed ratchet wheel 45a (Figs. 1—2—3—12) on shaft 45 engaged by a pawl 45b pivoted on an arm 46 having a hub which works in a bearing 47 (Fig. 1) for shaft 45 mounted on cylinder 32a.

At the outer end of arm 46 is a pin 46c on which one end of link 50 is pivoted (Figs. 1—2—3—5), the other end of said link being connected to a rocker arm 51 by pin 51a. Arm 51 is mounted on a stub shaft (Fig. 5) journaled in a bearing 52 mounted on the top of tank 1. A cam roller 51b (Figs. 2—3—5) is rotatably mounted on rocker arm 51 and operates in a groove in cam 53 keyed to main drive shaft 30 to give arm 51 a rocking movement, the first half rotation of said shaft causing cam 53 to retract rocker arm 46 back so that pawl 46a will engage a tooth in ratchet wheel 45a. On the first eighth of the remaining half revolution of shaft 30 forward movement is imparted to arm 46 and the feed wheel 44 is rotated one-fifth turn thereby sweeping all the aligned cans on track 43 between adjacent blades of the feed wheel into the open pocket of the feed valve in cylinder 32a. Feed wheel 44 remains stationary for the remaining portion of the revolution of shaft 30, with its blades in position as shown in Figs. 3—4 to receive another charge of cans from the placer feeds. Thus the forward movement of arm 46 is very quick to give plenty of time for the wheel 44 to receive another charge of cans from the placer feeds.

At the other end of shaft 45 from ratchet wheel 45a is mounted check ratchet wheel 48 (Figs. 1—4—13) which prevents backward rotation of feed wheel 44, and a pawl 49a pivoted on a pin 49b on a lug cast on the bearing 49 of shaft 45 (Figs. 1—2—4) engages ratchet wheel 48.

At each end of the can track 43 (Figs. 1—2—3—4) are duplicate can placer feeds which receive cans one at a time from can elevators, or any other source, and push them in position on track 43 between the blades of feed wheel 44 (Figs. 1—3—4) so that they may be swept into the pocket of feed valve 38 of cylinder 32a. The placer feeds are identical in construction and operation, but feed the cans in opposite directions, and comprise can tracks 55 (Figs. 1—2—3) cooperating with endless feed chains 56 carrying lugs 56a adapted to engage the ends of the cans in tracks 55 and push them inwardly of the machine onto track 43. Chains 56 run over sprockets 57 and 58, sprockets 57 being idlers mounted freely on shafts 57a fixed in their bearings 57b carried by tracks 55. The drive sprockets 58 are keyed on shafts 59 journaled in bearings 60 carried by tracks 55. Shafts 59 carry spiral gears 61 (Figs. 3—4) which mesh with spiral gears 62 (Figs. 1—3—4) on a drive shaft 63 journaled in bearings secured to the front plate 32, below track 43, said sets of spiral gears being right and left hand cut respectively so that the placer feed chains 56 at the ends of track 43 will move in opposite directions.

A sprocket 64 (Fig. 1) is keyed to the end of shaft 63, and is driven from a sprocket 65 (Figs. 2—5) by means of chain 66. Sprocket 64 is mounted on a shaft 67 having one end journaled in bearing 67a (Figs. 2 and 5) mounted on top of tank 1, and also journaled in bearings 67b and 67c (Fig. 5). Gears 68 and 69 are keyed on shaft 67, gear 68 meshing with gear 70, and gear 69 meshing with a gear 71, which gears 70 and 71 are loosely carried on a shaft 72 (Figs. 2—5) disposed above and parallel with shaft 67.

On the adjacent ends of the hubs of gears 70 and 71 are single jaw clutch teeth, and a clutch 73 having single jaw clutch teeth at each end is splined on shaft 72. Clutch 73 may be shifted to engage and drive either gear 70 or 71. The ratio between gears 68—70 is different from that of gears 69—71 in order that the feed drive shaft 67 may have two different speeds, to vary the speed of the placer feed chains 56, whereby when relatively long cans are being processed the slow speed ratio may be used, and when relatively short cans are being processed the speeds of the feeds may be correspondingly increased to feed more cans on track 43 so that the can pockets in propeller 12—13 of tank 1 will be filled with more cans, thus increasing the capacity of the cooker, or in other words, varying the capacity of the cooker relative to the length of the cans being processed. Gears 68—70 are the low speed gears, and are proportioned to feed ten of the longer cans into pockets P' (Fig. 6). Gears 69—71 are the high speed gears and will feed eleven of the shorter cans into pockets P2 (Fig. 6). A yoke 75 (Figs. 2—4—5) operates clutch 73, same having teeth fitting into an annular groove 73a in the clutch for shifting the latter into engagement with either gear 70 or 71. Yoke 75 is carried by a shifting arm 76 pivoted on a pin on bracket 77, a clutch shifting lever 78 being connected to the free end of arm 76 and extending to the side of tank 1 for the convenience of the operator in shifting clutch 73.

Shaft 72 (Figs. 2—4—5) is journaled in bearings 72a, 72b and 72c, and carries sprockets 79 and 80 respectively connected by chains 81 and 82 to their respective drive sprockets 83 and 84 (Fig. 2) loosely carried by a shaft 85 (Fig. 2). Sprockets 83 and 84 have single jaw clutch teeth on the adjacent faces of their hubs. A clutch 86 is feathered on shaft 85 and has a single jaw clutch at each end, and may be shifted to engage and drive either sprocket 83 or 84. The ratio between sprockets 79 and 83 is different from that of sprockets 80 and 84, so that feed drive shaft 67 may have two different speeds to permit the use of either one or both of the placer feeds. When both placer feeds are being utilized, each feeds five cans, therefore shaft 67 must rotate just half as fast as when only one of the placer feeds is used in order to position ten cans on the track 43. Sprockets 79 and 83 form the low speed drive and are shown in clutched relation in Fig. 2, and thus two lines of cans from the placer feeds are being run simultaneously, each feeding five cans to track 43. Sprocket 84 is twice as large as 83, and thus if clutch 86 is shifted to engage sprocket 84 the can placer feeds will operate twice as fast, therefore only one feed (either feed) need be utilized to feed ten cans onto track 43. Clutch 86 is shifted on shaft 85 by a yoke 87 having teeth which fit in an annular groove 86a on clutch 86, yoke 87 being carried by a shifting lever 88 (Figs. 2—5) the lower end of which is pivoted on a bracket 89 mounted on top of tank 1. A shifting rod 90 is connected to the free end of lever 88 and extends to the side of tank 1 for convenience in shifting clutch 86.

Shaft 85 is journaled in bearings 85a and 85b (Fig. 2) and carries an intermittent gear 91 (Figs. 2—4) meshing with an intermittent gear 92 on main drive shaft 30. The short dwell of intermittent gears 91 and 92 stops the placer chains 56 sufficiently long in the position shown in Fig. 1, for feed wheel 44 to sweep the cans positioned on track 43 between adjacent blades of said wheel into the feed valve pocket of cylinder 32a. The main feature of my feeding arrangement is that the cans being aligned on track 43 push the preceding cans into position between the blades of feed wheel 44, thus eliminating all space between the cans regardless of whether one or both placer feeds are being used, or whether long or short cans are being processed. Dogs 56a of placer feed chains 56 are always stopped accurately at a predetermined position so that the overall length of the series of cans on track 43 will be such that said series can be swept bodily into the can pockets of the can propeller 12—13 in tank 1.

Figure 1:
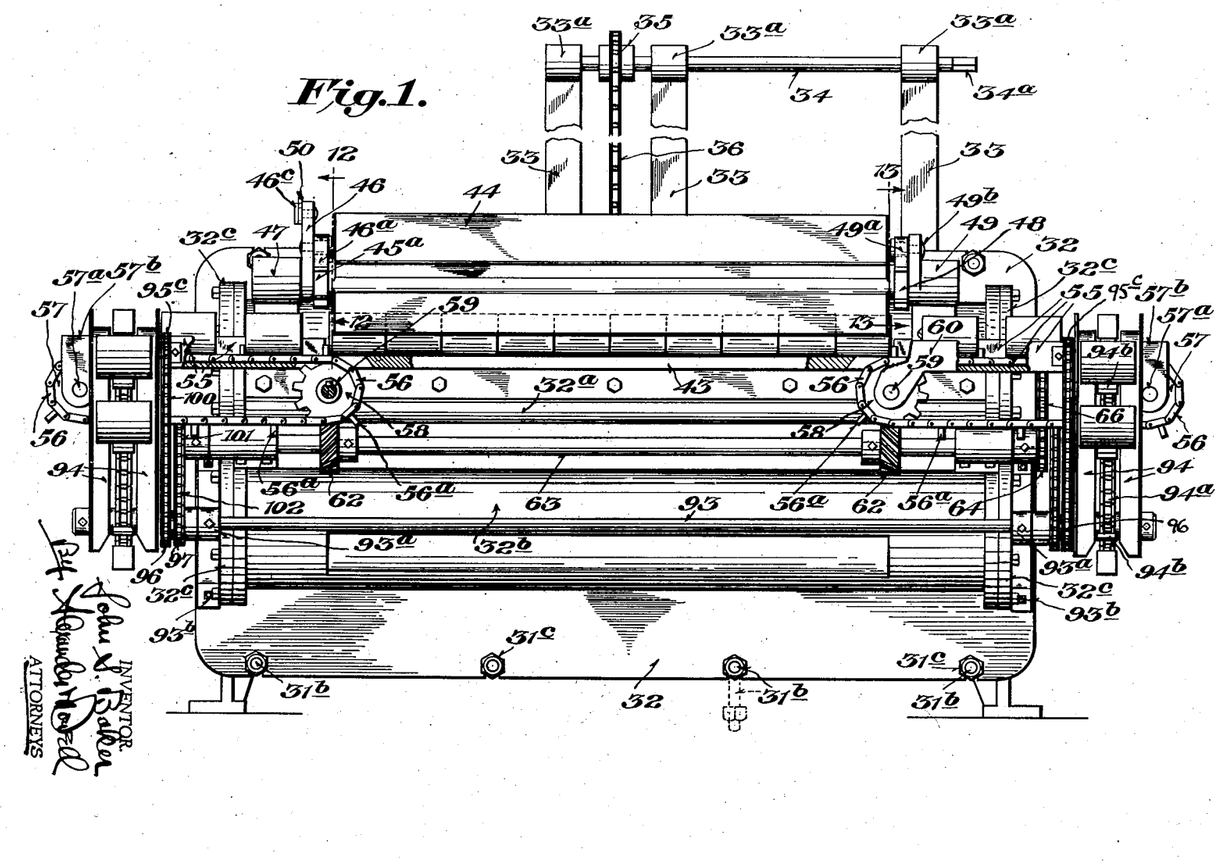
Fig. 1 is a front end elevation of the cooker, omitting however the driving mechanism on top thereof.

A shaft 93 (Figs. 1—3—4—10) extends across the front plate 32 and is supported at each end in braces 93a and held stationary therein by set screws as shown in Fig. 1. Braces 93a are removably secured on front plate 32 by bolts 93b (Figs. 1—3—4). On each end of fixed shaft 93 are freely mounted the inclined can elevators for the placer feeds, the upper ends of which elevators rest against tracks 55 and may swing outwardly therefrom. Each elevator raises the cans and feeds them between the dogs 56a of chains 56 of the placer feeds. The elevators are identical in construction and operation, and each comprises a pair of inclined angle iron tracks 94 (Figs. 1—2—3—4—10). As shown in Fig. 10, tracks 94 are riveted to brackets 98 (Figs. 3—10) having bearings receiving shaft 93. Between tracks 94 runs an endless chain 94a provided with dogs 94b which engage the cans C and raise them along tracks 94 to the tops thereof where the cans roll into placer can tracks 55 between the dogs 56a of the placer feed chains 56. Chains 94a run over sprockets 95a and 95b, sprockets 95a being loose (Fig. 10) on shaft 93. Sprockets 96 and 97 are secured together by rivets or the like and also loosely mounted on shaft 93. Sprockets 96, 97 are held in position on shaft 93 between braces 93a (Fig. 10) and brackets 98. Thus each elevator is freely swingable on shaft 93, so that its upper end may yield or move away from track 55 in event a can C is being carried improperly by the elevator to its respective placer feed. Sprockets 95b are keyed on drive shafts 95 (Figs. 3—4) which are journaled in bracket plates 99 to which the upper ends of tracks 94 are riveted, said brackets 99 merely resting against the sides of tracks 55. On each shaft 95 is keyed a sprocket 95c (Figs. 1 and 2) driven from sprocket wheel 96 on shaft 93 (Fig. 1) by chain 100. Sprocket 97 which is riveted to sprocket 96 is driven from a sprocket 101 (Fig. 3) by a chain 102, sprocket 101 being keyed to shaft 63.

All the feeding mechanism is thus mounted on front plate 32 so that when said plate is detached and raised and replaced again, the timing relations of the elevators, placer feeds, feed wheel and propeller are not disturbed.

Drive shaft 30 is journaled in bearings 30a mounted on top of tank 1 and carries a worm gear 104 driven by a worm 105 keyed on a shaft 106 journaled in a bearing 107 riveted to the tank 1, and preferably worm gear 104 is protected by a guard 108.

I claim:
1. In a machine for treating cylindrically packaged goods; a chamber having an inlet and an outlet; means within the chamber adapted to receive successive rows of packages in which the packages in each row are aligned end to end and to move the rows from the inlet to the outlet; said rows being disposed transversely of the direction of movement of the rows; opposed feeding means for feeding the packages to form a row opposite the inlet; means for jointly actuating said feeding means; each of said feeding means moving an aligned group of packages into position to form a single row; and variable speed means for actuating said feeding means according to the length of the packages being treated.

2. In combination with a machine as set forth in claim 1, means for actuating one feeding means to move an aligned group of packages; and means for correspondingly increasing the speed of said actuated feeding means according to the length of the packages being treated.

3. In a machine for treating cylindrically packaged goods, a chamber having an inlet and an outlet; a track therein; an endless propeller having a longitudinal series of transversely disposed pockets cooperating with the track, each pocket being adapted to receive one or more packages and to roll same along the track; means for feeding packages through the inlet and into said pockets; means for discharging the packages through the outlet; said track including upper and lower plates and means for transferring the packages from the upper to the lower plate; and said propeller comprising endless chains having their upper runs riding on the upper plate, T-shaped pusher bars extending across the track with their T-heads secured to said chains; sprockets around which the said chains run; means for driving said sprockets; guides disposed above the lower plate on which the lower runs of said chains ride; adjacent T-heads being sufficiently spaced to permit the packages to roll along the upper plate while preventing the packages from rising out of position between adjacent T-heads at the lower plate.

4. In a machine for treating cylindrically packaged goods, a chamber having an inlet and an outlet; a track therein; an endless propeller having a longitudinal series of transversely disposed pockets cooperating with the track, each pocket being adapted to receive one or more packages and to roll same along the track; means for feeding packages through the inlet and into said pockets; means for discharging the packages through the outlet; said propeller including endless chains at each side of the track and sprockets supporting the chains; a ratchet wheel on one sprocket; an oscillatory arm having a pawl engaging said ratchet; and crank means within the chamber for operating said arm whereby the can propeller will have gradual starting and gradual stopping movements thereby eliminating jerking.

5. In a machine for treating cylindrically packaged goods; a chamber having an inlet and an outlet; means within the chamber adapted to receive successive rows of packages in which the packages in each row are aligned end to end and to move the rows from the inlet to the outlet; opposed feeding means for feeding the packages to form a row opposite the inlet; means for jointly actuating said feeding means; a feed trough opposite the inlet; and said feeding means including endless conveyors at the ends of the feed trough beyond the sides of the inlet; means for moving said conveyors in opposite directions; means for placing packages on the conveyors; said conveyors pushing the packages thereon inwardly towards the middle of the inlet, the packages in the trough between the conveyors being moved by abutting contact with the outer packages on the conveyors thereby eliminating spaces between packages in the trough opposite the inlet; and means for intermitttently moving the packages in the trough opposite the inlet into the inlet.

6. In a machine for treating cylindrically packaged goods; a chamber having an inlet and an outlet; means within the chamber adapted to receive successive rows of packages in which the packages in each row are aligned end to end and to move the rows from the inlet to the outlet; opposed feeding means for feeding the packages to form a row opposite the inlet; means for jointly actuating said feeding means; a feed trough opposite the inlet receiving packages from the feeding means; a feed wheel over the feed trough having blades between which the packages from said feeding means are moved; a drive shaft; said feed actuating means intermittently positioning the packages in the trough and being actuated by said drive shaft; and said feed wheel being intermittently actuated by the drive shaft during the time the feed actuating means is stationary to transfer the aligned packages in the trough through the inlet.

7. In a machine for treating canned foods having a treating zone communicating with an elongated inlet and an elongated outlet disposed transversely of the length of the treating zone; means at the inlet for accumulating and aligning a group of cans end to end into position to form successive rows opposite and parallel with the inlet, a pair of feeding means for moving an aligned group of cans into position on said aligning means; means for singly actuating either of said feeding means to fill the said aligning means; means for utilizing both feeding means simultaneously for filling the said aligning means with cans; means for moving the successive rows of aligned cans on said aligning means into the inlet; and means for driving the feeding means.

8. In a machine as set forth in claim 7, each feeding means including conveyors; means for placing cans on said conveyors; means for driving said conveyors; said conveyors pushing an aligned group of cans end to end onto said accumulating means, the cans on the said accumulating means being moved inwardly towards the center of the inlet by abutting contact with the succeeding cans on the conveyors, thereby aligning a plurality of cans thereon end to end.

9. In a machine as set forth in claim 7, means for intermittently driving said feeding means, so that they will stop after predetermined movements to permit the accumulated cans on said accumulating means to be moved therefrom into the inlet.

10. In a machine for treating canned foods, a canway upon which the cans are rolled; a propeller cooperating with said canway and having a series of longitudinal pockets each receiving a plurality of cans placed end to end, said propeller rolling the cans along the canway; each of said longitudinal propeller can pockets being pitched to cause the cans at one side of each pocket to automatically remain separated from the cans at the other side by gravitation while being rolled along on the canway.

11. In a machine for treating canned foods, a canway comprising upper and lower flat plates on which the cans are rolled; sprocket wheels at each side of said canway; shafts for the sprockets; means for driving the shafts; endless chains running around said sprockets; and T-shaped bars extending transversely across the canway with their T-heads secured at their outer ends to said endless chains forming a series of single longitudinal pockets, each pocket being adapted to receive a plurality of cans disposed end to end and roll them along on the plates, the spaces between the adjacent T-heads permitting the cans to be rolled along on the upper plate; and said T-heads transferring the cans to the lower plate, and maintaining the cans on the lower plate.

12. In a machine of the character disclosed, a chamber having a detachable end plate; a removable canway therein on which the cans are moved; a propeller for moving the cans mounted on the said canway; a ratchet wheel on said canway for actuating the propeller; an oscillating arm having a pawl engaging said ratchet wheel; a main drive shaft; a rock shaft extending into said chamber and actuated by the main drive shaft; an arm in the chamber on said rock shaft; and a detachable link connecting the pawl arm and rock shaft arm; whereby when the link and end plate are detached the canway and propeller may be removed as a unit from the chamber.

13. In a machine for treating cylindrically packaged goods, having a treating zone communicating with an inlet and an outlet; opposed feeding means for feeding the packages to form a single row opposite the inlet; means for jointly actuating said feeding means; each of said feeding means moving an aligned group of packages into position to form a single row opposite the inlet; and variable speed means for actuating either feeding means to move an aligned group of packages to form said single row.

14. In a machine for treating packaged goods having a treating zone communicating with an elongated inlet and an elongated outlet disposed transversely of the length of the treating zone; variable speed feeding means for feeding packages into position to form successive rows opposite the inlet and parallel therewith; means for actuating said feeding means according to the length of the packages being processed; means for feeding the successive rows of packages into the inlet; and means adapted to receive said successive rows of packages and move them through the treating zone to the outlet whereby the capacity of the machine is varied relative to the length of the packages being processed.

15. In a machine as set forth in claim 14, said feeding means including conveyors; means for placing packages on said conveyors; means for driving said conveyors; said conveyors pushing an aligned group of packages end to end into said position; the packages being moved inwardly by abutting contact with the succeeding packages; thereby aligning a group of packages end to end opposite the inlet.

16. In a machine for treating canned goods having a treating zone; a canway therein upon which the cans are rolled; a propeller having a longitudinal series of transversely disposed elongated pockets each adapted to receive a plurality of cans freely disposed therein end to end, said propeller rolling the cans along the canway; said pockets being pitched to cause the cans introduced therein at one end of the pockets to remain separated from the cans therein at the other end by gravitation while being rolled along the canway, whereby different kinds of canned goods may be processed simultaneously in the pockets without becoming mixed.

17. In a machine of the character disclosed having a chamber provided with a detachable end plate; a removable packageway within the chamber; feeding means for feeding packages thereon; propeller means mounted upon the packageway for moving the packages thereon; a ratchet wheel on the packageway within the chamber for actuating said propeller means; an oscillating arm having a panel engaging said ratchet wheel; a main drive shaft for the feeding means; means extending into the chamber for actuating said arm; said means being actuated by the main drive shaft; and disconnectible means within the chamber for connecting the pawl arm to said actuating means whereby the packageway and propeller is detachable from the chamber and feeding means when the end plate and disconnectible means are disconnected.

18. In a machine for treating cylindrically packaged goods having a chamber provided with an inlet and an outlet and having a treating zone within the chamber communicating with said inlet and outlet; opposed feeding means for feeding the packages to form a row opposite the inlet; means for jointly actuating said feeding means; each of said feeding means moving an aligned group of packages into position to form a single row opposite the inlet; means for actuating one feeding means to move an aligned group of packages to form said single row; means for feeding the rows of packages into the treating zone; and means within the chamber adapted to receive the rows of packages in consecutive order and move them through the treating zone to the outlet.

19. In a machine for treating packaged goods having a chamber provided with a treating zone communicating with an inlet and an outlet in said chamber, feeding means for aligning and positioning a group of packages freely disposed end to end in a row opposite the inlet; means for varying the number of fed packages in said row relative to their individual lengths; means for actuating said feeding means; means for feeding the rows of packages into the treating zone; and means within the chamber adapted to receive the rows of packages as aligned, in a consecutive order and move them through the treating zone to the outlet.

20. In a machine for treating packaged goods having a chamber provided with an inlet and an outlet and having a treating zone within the chamber communicating with said inlet and outlet; opposed feeding means for feeding the packages to form a row opposite the inlet; means for jointly actuating said feeding means; each of said feeding means moving an aligned group of packages into position to form a single row opposite the inlet; means for actuating one feeding means singly to move an aligned group of packages to form said single row; means for feeding the rows of packages into the treating zone; and means within the chamber adapted to receive the rows of packages in a consecutive order and move them through the treating zone to the outlet.

21. In a machine as set forth in claim 20, said feeding means including conveyors; means for feeding the packages thereto; said conveyors moving the packages inwardly and positioning them in a single row by abutting contact; thereby aligning a group of packages end to end in a row opposite the inlet.

22. In a machine for treating canned goods having a can zone therein communicating with an elongated inlet and an elongated outlet disposed transversely of the length of the can zone, automatic feeding means for moving a group of cans into position to form successive rows of cans aligned end to end opposite the inlet and parallel therewith; means for varying the speed of said feeding means according to the length of the cans being processed, whereby the number of cans fed in said row may be varied; means for feeding the successive rows of cans into the can zone; and means within the can zone adapted to receive said successive rows of cans in consecutive order and move them therethrough to the outlet.

23. In a machine for treating canned goods having a can zone therein communicating with an elongated inlet and an elongated outlet disposed transversely of the length of the can zone; automatic feeding means for moving a group of cans end to end into position and aligning them by abutting contact in a single row opposite and parallel with the inlet; means for actuating said feeding means; means for feeding the rows of cans into the can zone; and means within the can zone adapted to receive the rows of cans in consecutive order and move them therethrough to the outlet.

JOHN S. BAKER.